US009964775B2

(12) United States Patent
Yeo

(10) Patent No.: US 9,964,775 B2
(45) Date of Patent: May 8, 2018

(54) LENS MOVING APPARATUS

(71) Applicant: LG INNOTEK CO., LTD., Seoul (KR)

(72) Inventor: In Jae Yeo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 134 days.

(21) Appl. No.: 14/795,297

(22) Filed: Jul. 9, 2015

(65) Prior Publication Data
US 2016/0018667 A1  Jan. 21, 2016

(30) Foreign Application Priority Data

Jul. 16, 2014 (KR) .................. 10-2014-0089877
Jul. 16, 2014 (KR) .................. 10-2014-0089878

(51) Int. Cl.
| G02B 27/64 | (2006.01) |
| G02B 7/04 | (2006.01) |
| G02B 7/08 | (2006.01) |
| H01F 7/20 | (2006.01) |

(52) U.S. Cl.
CPC .......... *G02B 27/646* (2013.01); *G02B 7/04* (2013.01); *G02B 7/08* (2013.01); *H01F 7/20* (2013.01)

(58) Field of Classification Search
CPC .............. G02B 7/04; G02B 7/08–7/105; G02B 13/001; G02B 27/646
See application file for complete search history.

(56) References Cited

U.S. PATENT DOCUMENTS

| 2006/0001987 A1* | 1/2006 | Maehara .................. G02B 7/08 359/824 |
| 2010/0002301 A1* | 1/2010 | Lee ...................... G02B 27/646 359/557 |
| 2012/0229926 A1 | 9/2012 | Wade et al. |
| 2013/0016427 A1 | 1/2013 | Sugawara |
| 2013/0039640 A1 | 2/2013 | Sekimoto |

(Continued)

FOREIGN PATENT DOCUMENTS

| EP | 1895344 A1 | 8/2007 |
| EP | 2899579 A2 | 1/2015 |

(Continued)

OTHER PUBLICATIONS

European Search Report dated Nov. 6, 2015 in European al Application No. 15176923.9.

*Primary Examiner* — Cara Rakowski
(74) *Attorney, Agent, or Firm* — Saliwanchik, Lloyd & Eisenschenk

(57) ABSTRACT

A lens moving apparatus includes a housing supporting a driving magnet, a bobbin provided on an outer surface thereof with a coil disposed in the driving magnet and moving in a first direction in the housing, a base disposed under the bobbin to be spaced apart from the bobbin by a predetermined distance, an upper elastic member disposed above the bobbin and including an inner frame connected to the bobbin and an outer frame coupled to the housing, and a support member coupled at a lower portion thereof to the base and including a projecting portion protruding upward and bent at at least a portion thereof, at least a portion of the bent portion of the projecting portion being coupled to the upper elastic member.

20 Claims, 16 Drawing Sheets

(56) References Cited

U.S. PATENT DOCUMENTS

| | | | | |
|---|---|---|---|---|
| 2013/0107068 A1* | 5/2013 | Kim | ................ | G03B 5/00 |
| | | | | 348/208.11 |
| 2013/0120648 A1 | 5/2013 | Oh | | |
| 2013/0215511 A1 | 8/2013 | Wu et al. | | |
| 2015/0153539 A1* | 6/2015 | Yoo | ................ | G02B 7/04 |
| | | | | 348/373 |
| 2015/0212291 A1* | 7/2015 | Lee | ................ | G02B 7/08 |
| | | | | 348/360 |
| 2015/0253583 A1* | 9/2015 | Cho | ............ | G02B 13/0015 |
| | | | | 348/360 |
| 2015/0362686 A1* | 12/2015 | Wang | ............ | G02B 6/4292 |
| | | | | 385/89 |
| 2016/0011394 A1* | 1/2016 | Cho | ................ | G02B 7/09 |
| | | | | 359/822 |
| 2016/0070114 A1* | 3/2016 | Hubert | ............ | G02B 27/646 |
| | | | | 348/208.5 |
| 2016/0109719 A1* | 4/2016 | Cho | ................ | G03B 3/10 |
| | | | | 359/557 |
| 2016/0191754 A1* | 6/2016 | Cho | ............ | H04N 5/2257 |
| | | | | 348/357 |

FOREIGN PATENT DOCUMENTS

| | | | |
|---|---|---|---|
| KR | 20110047541 A | | 5/2011 |
| KR | 101343197 B1 | | 12/2013 |
| WO | WO-2014100516 A1 | | 6/2014 |

* cited by examiner (a)

(b)

LENS MOVING APPARATUS

CROSS REFERENCE TO RELATED APPLICATIONS

This application claims the benefit under 35 U.S.C. § 119 of Korean Patent Application Nos. 10-2014-0089877 and 10-2014-0089878, filed Jul. 16, 2014, which are herein incorporated by reference in their entirety.

TECHNICAL FIELD

Embodiments relate to a lens moving apparatus, and more particularly, to a lens moving apparatus having an improved optical image stabilizing effect.

BACKGROUND

Recently, information technology products such as cellular phones, smart phones, tablet PCs and notebook PCs, in which ultracompact digital cameras are incorporated, are being actively developed.

A camera module mounted in a small-sized electronic product, such as a smart phone, may be frequently subjected to shock during use. In addition, the camera module may minutely shake due to the hand trembling of a user's hand during photography. Therefore, there is a high necessity for a technology capable of installing an optical image stabilizer in the camera module.

In order to further improve such an optical image stabilizer, there is a necessity for structural improvement of a lens moving apparatus by the adjustment of focal length along an optical axis or the provision of an optical image stabilizing function.

BRIEF SUMMARY

Embodiments provide a lens moving apparatus having an improved optical image stabilizing effect.

In one embodiment, a lens moving apparatus includes a housing supporting a driving magnet, a bobbin provided on an outer surface thereof with a coil disposed in the driving magnet and moving in a first direction in the housing, a base disposed under the bobbin to be spaced apart from the bobbin by a predetermined distance, an upper elastic member disposed above the bobbin and including an inner frame coupled to the bobbin and an outer frame coupled to the housing, and a support member coupled at a lower portion thereof to the base and including a projecting portion protruding upward and bent at at least a portion thereof, at least a portion of the bent portion of the projecting portion being coupled to the upper elastic member.

In another embodiment, a lens moving apparatus includes a housing supporting a driving magnet, a bobbin provided on an outer surface thereof with a coil disposed in the driving magnet and moving in a first direction in the housing, a base disposed under the bobbin to be spaced apart from the bobbin by a predetermined distance, and a support member disposed at a lateral surface of the housing, the support member being coupled at an upper portion thereof to the housing and coupled at a lower portion thereof to the base, and supporting the bobbin and the housing such that the bobbin and the housing are movable in second and third directions, which are perpendicular to the first direction, wherein a bonding portion is disposed at at least a portion of the support member.

BRIEF DESCRIPTION OF THE DRAWINGS

Arrangements and embodiments may be described in detail with reference to the following drawings, in which like reference numerals refer to like elements and wherein.

DETAILED DESCRIPTION

Figure 1:
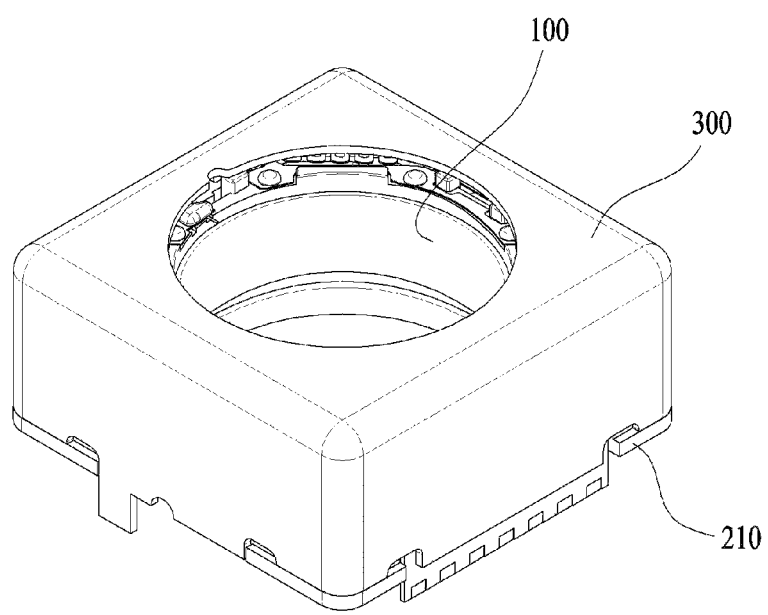
FIG. 1 is a schematic perspective view showing a lens moving apparatus according to an embodiment.

Hereinafter, embodiments will be described with reference to the attached drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper rate.

For reference, in the respective drawings, a rectangular coordinate system (x, y, z) may be used. In the drawings, the x-axis and the y-axis indicate a plane perpendicular to the optical axis, and for convenience, the optical axis (z-axis) direction may be referred to as a first direction, the x-axis direction may be referred to as a second direction, and the y-axis direction may be referred to as a third direction.

Figure 2:
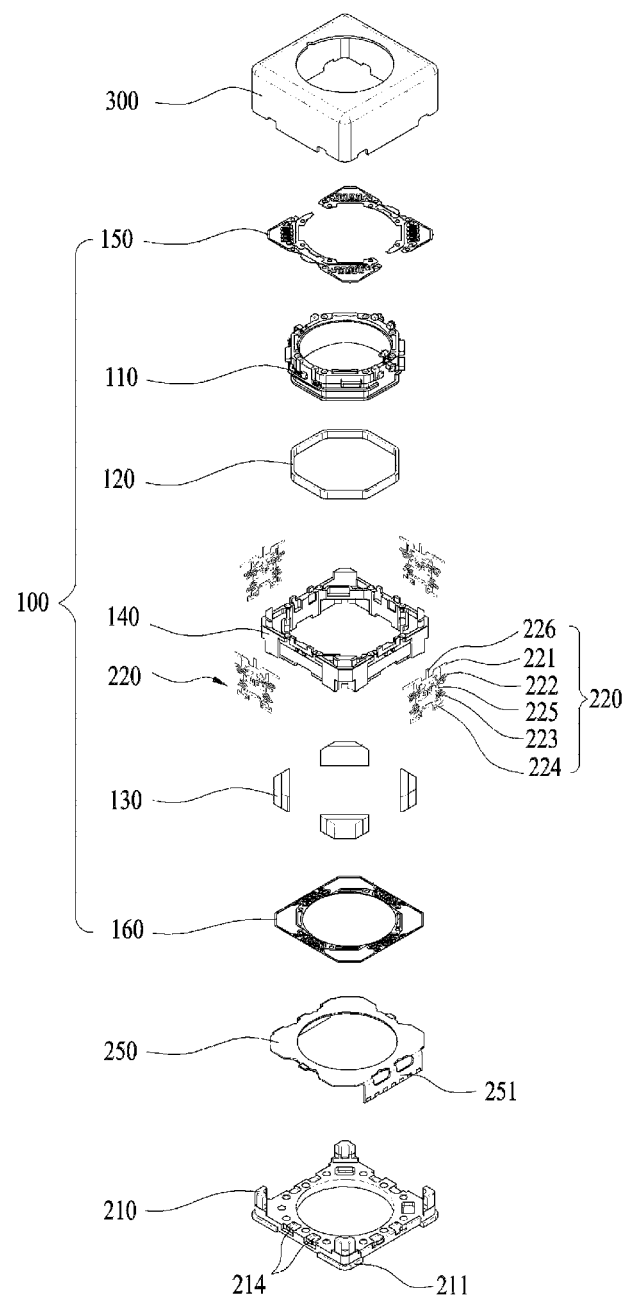
FIG. 2 is an exploded perspective view showing the lens moving apparatus according to the embodiment.
Figure 3:
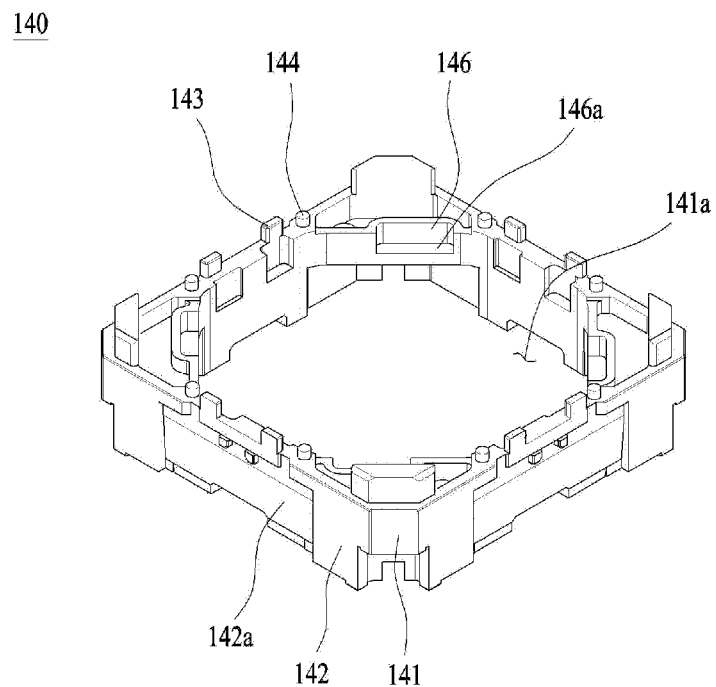
FIG. 3 is a perspective view showing a housing according to the embodiment.
Figure 4:
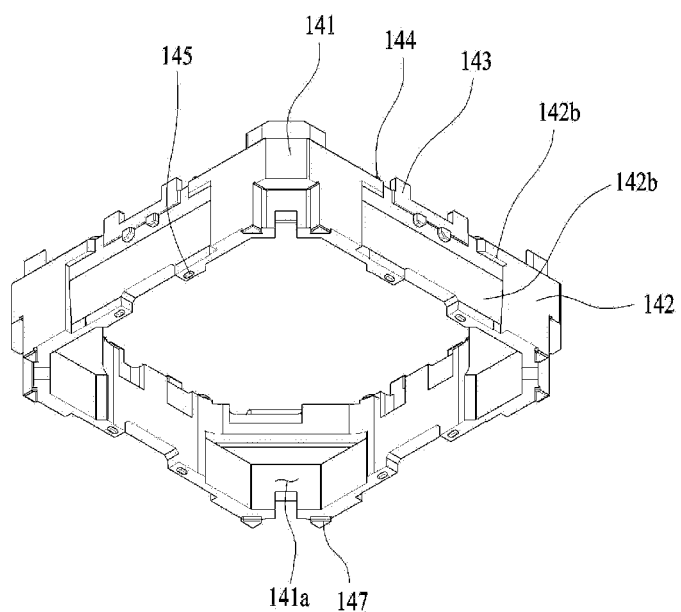
FIG. 4 is a rear perspective view showing the housing according to the embodiment.
Figure 5:
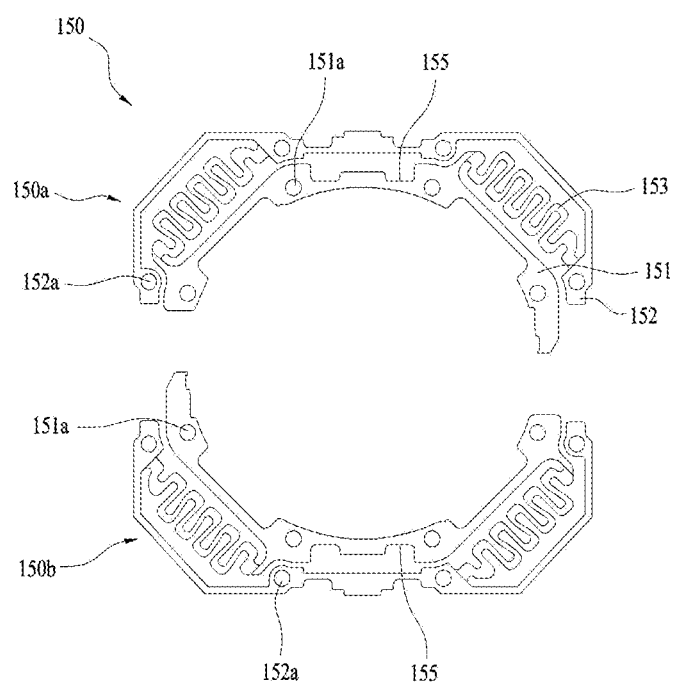
FIG. 5 is a plan view showing an upper elastic member 150 according to the embodiment.
Figure 6:
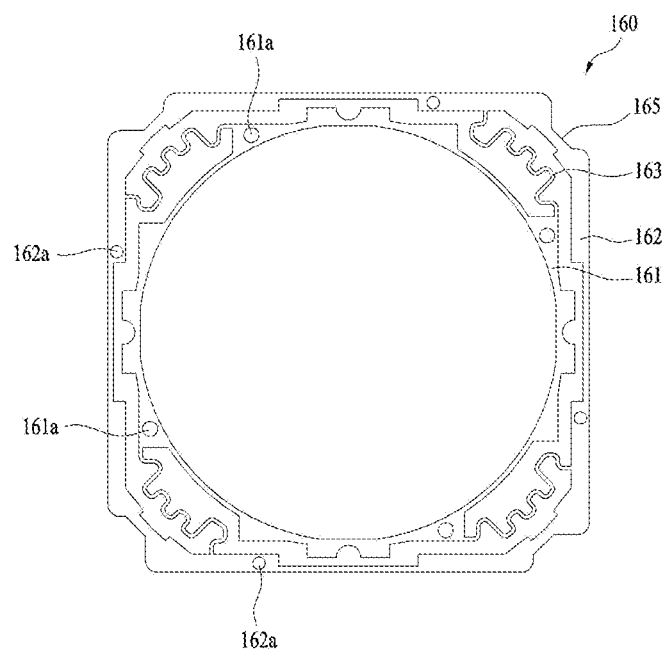
FIG. 6 is a plan view showing a lower elastic member according to the embodiment.

FIG. 1 is a schematic perspective view showing a lens moving apparatus according to an embodiment. FIG. 2 is an exploded perspective view showing the lens moving apparatus according to the embodiment. FIG. 3 is a perspective view showing a housing 140 according to the embodiment. FIG. 4 is a rear perspective view showing the housing 140 according to the embodiment. FIG. 5 is a plan view showing an upper elastic member 150 according to the embodiment. FIG. 6 is a plan view showing a lower elastic member 160 according to the embodiment.

A handshake correction apparatus, which is applied to compact camera modules of mobile devices such as smart phones or tablet PCs, refers to an apparatus configured to prevent the contour of an image captured upon still image shooting from not being clearly formed due to vibration caused by user handshake. In addition, an autofocusing apparatus is configured to automatically focus the subject image on the surface of an image sensor. The handshake correction apparatus and the autofocusing apparatus may be configured in various manners. In this embodiment, the handshake correction and/or autofocusing operations may be performed in such a manner as to move an optical module composed of a plurality of lenses in a first direction or on a plane perpendicular to an optical axis.

As shown in FIGS. 1 and 2, the lens moving apparatus according to the embodiment may include a movable unit 100. The movable unit 100 may fulfill the functions of autofocusing and handshake correction of a lens.

As shown in FIG. 2, the movable unit 100 may include a bobbin 110, a coil 120, a first magnet 130, a housing 140, an upper elastic member 150 and a lower elastic member 160.

The bobbin 110 may be provided on an outer surface thereof with the coil 120 disposed in the first magnet 130, and thus the bobbin 110 may be installed in a space inside the housing 140 to be reciprocated in a first direction by the electromagnetic interaction between the first magnet 130 and the coil 120. Since the bobbin 110 is provided at the outer surface thereof with the coil 120, the electromagnetic interaction may occur between the coil 120 and the first magnet 130.

The bobbin 110 may be elastically supported by upper and lower elastic members 150 and 160 such that the autofocusing function is fulfilled by the movement of the bobbin 110 in the first direction.

Although not shown in the drawing, the bobbin 110 may include a lens barrel (not shown) including at least one lens installed therein. The lens barrel may be installed in the bobbin 110 in various manners.

For example, the lens barrel may be coupled to the bobbin 110 in such a manner that a female threaded portion is formed at an inner surface of the bobbin 110 and a male threaded portion corresponding to the female threaded portion is formed at an outer surface of the lens barrel to engage therewith. However, the disclosure is not limited thereto, and the lens barrel may be directly installed in the bobbin 110 by ways other than the threaded engagement by formation of the threaded portion at the inner surface of the bobbin 110. Alternatively, at least one lens may also be integrally formed with the bobbin 110 without the lens barrel.

The lens coupled to the lens barrel may be composed of a single lens, or may be composed of two or more lenses constituting an optical system.

An autofocusing function may be controlled by the direction of electric current, and may be fulfilled by moving the bobbin 110 in the first direction.

For example, the bobbin 110 may move upward from the initial position upon the application of forward current whereas the bobbin 110 may move downward from the initial position upon the application of reverse current. In addition, the moving distance of the bobbin 110 from the initial position in one direction may be increased or decreased by controlling the amount of current flowing in the one direction.

The bobbin 110 may be provided at upper and lower surfaces thereof with an upper support protrusion 113 (see FIG. 7) and a lower support protrusion (not shown). The upper support protrusion 113 may be configured to have a cylindrical shape or a polygonal column shape such that the inner frame 151 of the upper elastic member 150 is coupled to or released from the bobbin 110.

According to this embodiment, the inner frame 151 may have a first through hole 151a formed at a position corresponding to the upper support protrusion 113.

The upper support protrusion 113 may be inserted in the first through hole 151a by means of thermal fusion or an adhesive material such as epoxy. The upper support protrusion 113 may include a plurality of upper support protrusions. The distance between the respective upper support protrusions 113 may be properly predetermined within the range within which interference with peripheral components can be avoided.

Specifically, the upper support protrusions 113 may be symmetrically arranged at a constant interval around the center of the bobbin 110, or may be arranged at non constant intervals to be symmetrical with respect to a specific virtual line passing through the center of the bobbin 110.

The lower support protrusion may be configured to have a cylindrical shape or a polygonal column shape, similarly to the upper support protrusion 113, such that the inner frame 161 of the lower elastic member 160 is coupled to or released from the bobbin 110.

According to the embodiment, the inner frame 161 may have a third through hole 161a formed at a position corresponding to the lower support protrusion. The lower support protrusion may be inserted in the third through hole 161a by means of thermal fusion or an adhesive material such as epoxy. The lower support protrusion may include a plurality of lower support protrusions.

The distance between the respective lower support protrusions may be appropriately predetermined within the range within which interference with peripheral components can be avoided. In other words, the lower support protrusions may be symmetrically arranged at a constant interval around the center of the bobbin 110.

The housing 140 may be configured into an approximate rectangular column shape for supporting the first magnet 130. According to this embodiment, the housing 140 may be configured into an octagonal column shape, as shown in FIGS. 3 and 4. The housing 140 may include a first surface 141 and a second surface 142. The first surface 141 may be intended to allow the first magnet 130 to be mounted thereon, and the second surface 142 may be intended to allow a support member 220 to be mounted thereon.

The first surface 141 may be formed at a corner region. According to this embodiment, the first surface 141 may be configured to have a surface area equal to or larger than the surface area corresponding to the first magnet 130. The first magnet 130 may be mounted in a first magnet mount portion 141a formed at an inner surface of the first surface 141.

The first magnet mount portion 141a may be configured to have a size corresponding to the first magnet 130 and to face the first magnet 130 at three surfaces, that is, at both lateral surfaces and an upper surface thereof.

Although the first magnet 130 may be attached to the first magnet mount portion 141a by means of adhesive, the disclosure is not limited thereto and an adhesive member such as a piece of double-sided tape may be used. Alternatively, in place of the recessed portion as shown in FIG. 4, the first magnet mount portion 141a may be configured into a mount hole in which the first magnet 130 is partially inserted or exposed.

The housing 140 may be provided at an upper surface thereof with a plurality of third stoppers 143 protruding upward. The third stoppers 143 may restrict the upward movement of the housing 140.

Furthermore, the third stoppers 143 also serves to guide the installation position of the upper elastic member 150. To this end, the upper elastic member 150 may have guide recesses 155, which are formed at positions corresponding to the third stoppers 143 and have a shape corresponding to that of the third stoppers 143, as shown in FIG. 5.

Although the first surface 141 may be formed to be parallel to the lateral surface of a cover member 300, this disclosure is not limited thereto. In addition, the first surface 141 may be configured to have a larger surface than that of the second surface 142.

As shown in FIGS. 3 and 4, the second surface 142 may be provided with an escaping recess 142a having a predetermined depth. According to the embodiment, the escaping recess 142a may have an open lower surface. However, the disclosure is not limited thereto. The escaping recess 142a may have an open upper surface, or both the lower and upper surfaces thereof may be open.

With the provision of the escaping recess 142a, spatial interference between connecting members 153 and 163 and the bobbin 110 is avoided, and thus elastic deformation of the connecting members 153 and 163 may be more easily caused when the bobbin 110 moves in the first direction with respect to the housing 140. Furthermore, a lower portion of the escaping recess 142a may serve to prevent a coupling portion 224 of the lower part of the support member 220 from interfering with the housing 140. In addition, as shown in FIG. 4, an upper portion of the escaping recess 142a may be provided with a stepped portion 142b to support a portion of an upper part of the support member 220.

Although the escaping recess 142a may be positioned at a lateral surface of the housing 140 as in the embodiment, it may alternatively be positioned in a corner of the housing 140 depending on the shape and/or position of the support member 220.

The housing 140 may be provided at an upper surface thereof with a plurality of upper frame support protrusions 144 to which an outer frame 152 of the upper elastic member 150 is coupled. The upper frame support protrusions 144 may be more numerous than the upper support protrusions 113 because the outer frame 152 is longer than the inner frame 151.

The outer frame 152 may have second through holes 152a which are formed at positions corresponding to the upper frame support protrusions 144, and may have a shape corresponding to the upper support protrusions 144. The upper frame support protrusions 144 may be inserted in the second through holes 152a by means of adhesive or thermal fusion.

As shown in FIG. 4, the housing 140 may be provided at a lower surface thereof with a plurality of lower frame support protrusions 145 to which an outer frame 162 of the lower elastic member 160 is coupled. The lower frame support protrusions 145 may be more numerous than the lower support protrusions because the outer frame 162 of the lower elastic member 160 is longer than the inner frame 161.

The outer frame 162 may have fourth through holes 162a which are formed at positions corresponding to the lower frame support protrusions 145 and have a shape corresponding to that of the lower frame support protrusions 145. The lower frame support protrusions 145 may be inserted in the fourth through holes 162a by means of adhesive or thermal fusion.

The housing 140 may further be provided at a lower surface thereof with fourth stoppers 147. The fourth stoppers 147 may serve to restrict the downward moving distance of the housing 140. Therefore, the fourth stoppers 147 may prevent the bottom surface of the housing 140 from colliding with a base 210 and/or a printed circuit board 250.

The fourth stoppers 147 may be maintained in the state of being spaced a predetermined distance apart from the base 210 and/or the printed circuit board 250 during an initial stage or during normal operation. By virtue of this construction, the housing 140 may be spaced apart not only from the base 210 disposed thereunder but also from the cover member 300 disposed thereover, and, as such, the housing 140 may be maintained at a constant level in the first direction without interference from upper and lower obstacles. Accordingly, the housing 140 may perform a shifting action in second and third directions perpendicular to the first direction.

As shown in FIGS. 5 and 6, the upper elastic member 150 and the lower elastic member 160 may flexibly support the upward and/or downward movement of the bobbin 110 in the first direction. The upper elastic member 150 and the lower elastic member 160 may be constituted by a leaf spring.

The upper elastic member 150, which is disposed over the bobbin 110, is configured such that the inner frame 151 is coupled to the bobbin 110 and the outer frame 152 is coupled to the housing 140. The lower elastic member, which is disposed under the bobbin 110, is configured such that the inner frame 161 is coupled to the bobbin 110 and the outer frame 162 is coupled to the housing 140.

The upper elastic member 150 and the lower elastic member 160s may include the inner frames 151 and 161 coupled to the bobbin 110, the outer frames 152 and 162 coupled to the housing 140, and the connecting members 153 and 163 connected between the inner frames 151 and 161 and the outer frames 152 and 162, respectively.

The connecting members 153 and 163 may be bent at least once to form a predetermined pattern. By virtue of positional change and fine deformation of the connecting members 153 and 163, the upward and/or downward movement of the bobbin 110 in the first direction may be flexibly (or elastically) supported.

According to the embodiment, the upper elastic member 150 has the plurality of second through holes 152a formed in the outer frame 152, and the plurality of first through holes 151a formed in the inner frame 151, as shown in FIG. 5.

The second through holes 152a may be fitted over the upper frame support protrusions 144 provided on the upper surface of the housing 140, and the first through holes 151a or recesses may be fitted over the upper support protrusions 113 provided on the upper surface of the bobbin 110. In other words, the outer frame 152 may be fixedly coupled to the housing 140 through the second holes 152a, and the inner frame 151 may be fixedly coupled to the bobbin 110 through the first through holes 151a or recesses.

The connecting member 153 may connect the inner frame 151 to the outer frame 152 such that the inner frame 151 is elastically deformable with respect to the outer frame 152 in the first direction within a predetermined range.

At least one of the inner frame 151 and outer frame 152 of the upper elastic member 150 may be provided with at least one first terminal member 251 conductively connected to at least one of the coil 120 of the bobbin 110 and the printed circuit board 250.

As shown in FIG. 6, the lower elastic member 160 has the plurality of fourth through holes 162a or holes formed in the outer frame 162, and the plurality of third through holes 161a or recesses formed in the inner frame 161.

The fitting recesses 162a or holes may be fitted over the lower frame support protrusions 145, and the third through holes 161a or recesses may be fitted over the lower support protrusions provided on a lower surface of the bobbin 110. In other words, the outer frame 162 may be fixedly coupled to the housing 140 through the fitting recesses 162a or holes, and the inner frame 161 may be fixedly coupled to the bobbin 110 through the third through holes 161a or recesses.

The connecting members 163 may connect the inner frame 161 to the outer frame 162 such that the inner frame 161 is elastically deformable with respect to the outer frame 162 in the first direction within a predetermined range.

As shown in FIG. 5, the upper elastic member 150 may include a first upper elastic member 150a and a second upper elastic member 150b, which are separated from each other. Thanks to the dual partitioning structure, different polarity currents or different electric powers may be applied to the first upper elastic member 150a and the second upper elastic member 150b of the upper elastic member 150.

Specifically, the inner frame 151 and the outer frame 152 are coupled to the bobbin 110 and the housing 140, respectively, and then solder portions are provided at positions corresponding to opposite ends of the coil 120 disposed at the bobbin 110. Subsequently, conductive connections such as solder are provided at the solder portions, whereby different polarity currents or different electric powers may be applied to the first upper elastic member 150a and the second upper elastic member 150b. In addition, the first upper elastic member 150a is conductively connected to one of opposite ends of the coil 120, and the second upper elastic member 150b is conductively connected to the second upper elastic member 150b, thus enabling external current and/or voltage to be applied thereto.

The upper elastic member 150 and the lower elastic member 160 may be assembled to the bobbin 110 and the housing 140 through a bonding process by thermal fusion and/or adhesive. In some cases, the assembly operation comprises thermal fusion and then bonding by adhesive, performed in that order.

In a modification thereof, the lower elastic member 160 may be configured into a dual partitioning structure, and the upper elastic member 150 may be configured as an integral structure.

At least one of the inner frame 161 and the outer frame 162 of the lower elastic member 160 may be conductively connected to at least one of the coil 120 of the bobbin 110 and the printed circuit board 250. The printed circuit board 250 may include the at least one first terminal member 251, which may be conductively connected to the elastic member.

The printed circuit board 250 may be coupled to the upper surface of the base 210. As shown in FIG. 2, the printed circuit board 250 may have a through hole through which a support member mount recess 214 is exposed.

The printed circuit board 250 may be provided with a surface on which the bent first terminal member 251 is mounted. According to the embodiment, the printed circuit board 250 may be provided with a bent surface on which the single first terminal member 251 is mounted. A plurality of terminals may be disposed on the surface on which the first terminal member 251 is mounted so as to supply electric power, supplied from the outside to the coil 120. The number of the terminals may be increased or decreased in accordance with the components that are required to be controlled. The printed circuit board 250 may further include an additional bent surface and an additional terminal member.

The base 210 is disposed under the bobbin. As shown in FIG. 2, the base 210 may be configured into an approximate rectangular shape, and may provided at a flat surface thereof with the support member 220 held thereto. The base 210 may be provided with stepped portions 211 to which adhesive is applied when the cover member 300 is adhesively attached thereto. The bottom surface of the stepped portion 211 may contact an end of the cover member 300.

The base 210 may have a support recess formed at a surface facing the first terminal member 251 of the printed circuit board 250 and having a size corresponding to the first terminal member 251. The support recess may be recessed from the outer surface of the base 210 by a predetermined depth such that the portion of the first terminal member 251 that protrudes from the base 210 is eliminated or controlled to a desired amount.

The stepped portions 211 may guide the cover member 300, which is mounted on the base 210. The cover member 300 may be mounted on the base 210 such that an end of the cover member 300 engages with the base 210 in a surface contact manner. The stepped portions 211 and the end of the cover member 300 may be adhesively attached to each other or sealed by means of, for example, adhesive.

The base 210 may be provided at corners of an upper surface thereof with the support member mount recess 214, in which the support member 220 is inserted. The support member mount recess 214 may be provided with adhesive so as to securely hold the support member 220.

The end of the support member 220 may be inserted or disposed in the support member mount recess 214, and then may be secured thereto by means of adhesive or the like. The support member mount recess 214 may include one or more support member mount recesses formed at the flat surface at which the support member 220 is installed. The support member mount recess 214 may have an approximate rectangular shape.

As shown in FIG. 2, according to the embodiment, the support member mount recesses 214 may be provided in the base 210 in such a manner that two support member mount recesses 214 are provided in each flat surface. The number of support member mount recesses 214 may be increased or decreased in accordance with a shape of the support member 220, and three or more support member mount recesses 214 may be provided in each flat surface.

The cover member 300 may be configured into an approximate box shape capable of accommodating the movable unit 100, the printed circuit board 250 and the base 210. As shown in FIG. 1 etc., the cover member 300 may have escaping portions or recesses formed in positions corresponding to the stepped portions 211 of the base 210, and, as such, adhesive and the like may be injected through the escaping portions or recesses.

At this point, the adhesive is set to have a lower viscosity such that the adhesive injected through the escaping portions or recesses can infiltrate the contact areas between the stepped portions 211 and the end of the cover member 300. The adhesive applied to the escaping portions or recesses fills the gap between the mating surfaces of the cover member 300 and the base 210 through the escaping portions of recesses, thus enabling the cover member 300 to be sealingly coupled to the base 210.

Meanwhile, a camera module may be constructed in such a manner as to dispose an image sensor and the printed circuit board 250 under the base 210 and to assemble the bobbin 110 with a lens barrel. Alternatively, an additional image sensor holder may be provided under the base 210. Furthermore, the base 210 may extend downward, and a camera module board including an image sensor mounted thereon may be directly coupled to the bottom surface of the base 210. The camera module may be applied to mobile devices such as cellular phones.

Figure 7:
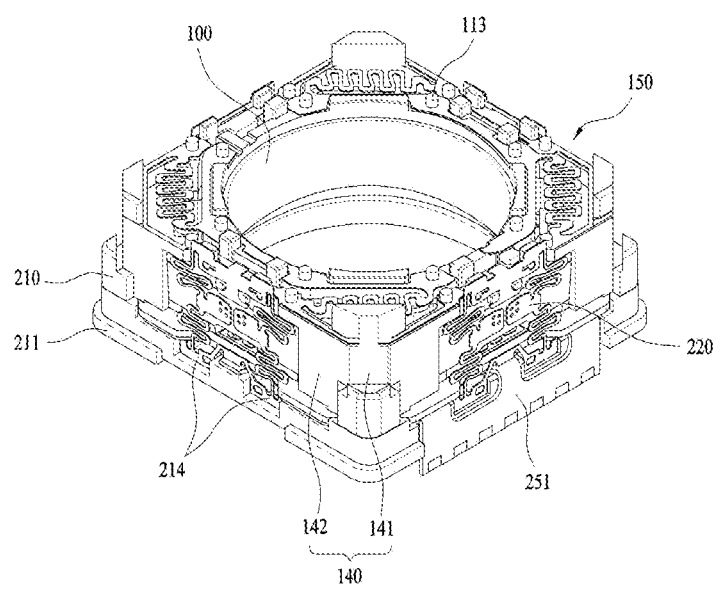
FIG. 7 is a perspective view showing the support members installed at the lens moving apparatus according to the embodiment.
Figure 8:
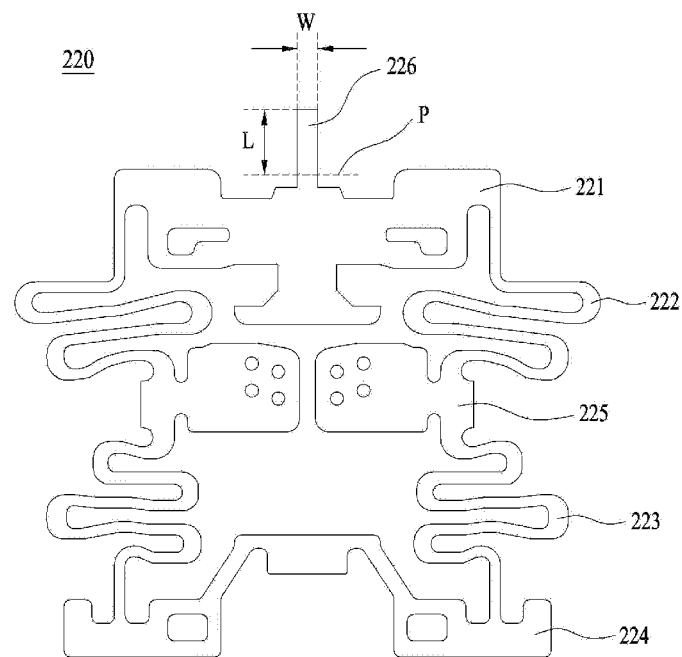
FIG. 8 is a front view showing the support member according to the embodiment.
Figure 9:
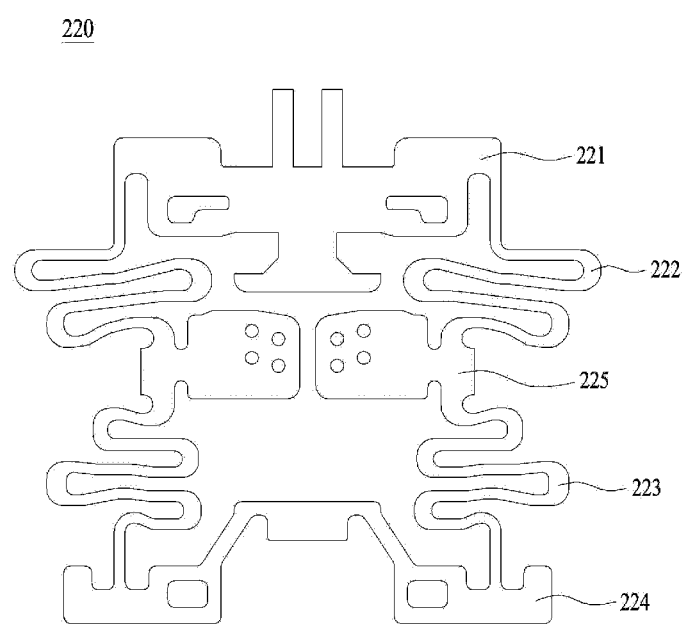
FIG. 9 is a front view showing a support member according to another embodiment.

FIG. 7 is a perspective view showing the support members 220 installed on the lens moving apparatus according to the embodiment. FIG. 8 is a front view showing the support member 220 according to the embodiment. FIG. 9 is a front view showing a support member 220 according to another embodiment.

The support member 220 may be coupled at a lower portion thereof to the base 210, and may include a projecting portion 226 extending upward and bent at at least a portion thereof. At least a portion of the bent portion 226a of the projecting portion 226 may be coupled to the upper elastic member 150.

As shown in FIG. 7, the support members 220 may be separately disposed on the second surfaces 142 of the housing 140 so as to support the housing 140 in the state of being spaced apart from the base 210 by a predetermined distance. An end of the support member 220 may be inserted or disposed in the support member mount recess 214, and may then be coupled thereto using an adhesive material such as epoxy. The other end of the support member 220 includes the projecting portion 226, serving to couple the support member 220 to the upper elastic member 150.

The support member 220 is positioned such that the lower surface of the bent portion 226a of the projecting portion 226 faces the upper surface of the upper elastic member 150. The upper elastic member 150 and the bent portion 226a may be coupled to each other by means of a conductive coupling material. The conductive coupling material may include solder, conductive adhesive, welding or the like.

Since the support members 220 according to the embodiment are disposed on the second surfaces 142 of the housing 140, all four support members 220 may be symmetrically disposed. However, the disclosure is not limited thereto, and a total of eight support members 220 may be provided, two on each flat surface. The support member 220 may be conductively connected to the upper elastic member 150 or the flat surface of the upper elastic member 150.

Since the support member 220 is constructed separately from the upper elastic member 150, the support member 220 and the upper elastic member 150 may be conductively connected to each other by means of conductive adhesive, solder, welding or the like. Accordingly, the upper elastic member 150 may apply current to the coil 120 through the support member 220 conductively connected thereto.

Specifically, the support member 220 according to the first embodiment may include a first coupling portion 221, a second coupling portion 224, a first elastic deformation portion 222, a second elastic deformation portion 223, and a connecting portion 225.

A support member 220 according to another embodiment may include a first coupling portion 221, a second coupling portion 224, and an elastic deformation portion. In this case, the elastic deformation portion may serve as the connecting portion.

The first coupling portion 221 of the support member 220 according to the first embodiment may be coupled to the upper elastic member 150 by means of the projecting portion 226 provided thereat. The projecting portion 226 protrudes from the first coupling portion 221, and a portion of the projecting portion 226 is bent to serve as the bent portion 226a. The bent portion 226a may be coupled to the upper elastic member 150 by means of conductive adhesive, solder, welding or the like. In the following description, an example in which coupling is implemented by soldering is mainly described.

In the case of coupling by soldering, after solder is applied to cover the bent portion 226a, a soldering process may be performed using a soldering device. The soldering process may also be performed using solder wire in place of the solder cream.

In the fabrication process, the projecting portion 226 may be integrally formed with the support member 220, or the bent portion 226a may be separately prepared and then coupled to the upper portion of the support member 220.

When the projecting portion 226 is prepared separately from the support member 220, a procedure of coupling the projecting portion 226 to the support member 220 is further added. However, since the bent portion 226a is formed at the projecting portion 226 prior to the coupling procedure, it may be possible to prevent defects in the entire support member 220 caused by formation of the bent portion 226a.

Although the projecting portion 226 may be composed of a single projecting portion as shown in FIG. 8, it may also be composed of a plurality of projecting portions 226, as shown in FIG. 9. When a plurality of projecting portions 226 are provided, the respective projecting portions 226 may be bent and may be spaced apart from each other by a predetermined distance in a second direction, which is perpendicular to the first direction. Here, the number of projecting portions 226 may be predetermined in consideration of ease of coupling between the projecting portions 226 and the upper elastic member 150, the coupling strength between the projecting portions 226 and the upper elastic member 150 and the like.

The projecting portion 226 and the bent portion 226a may have the same width (W), which is predetermined in consideration of ease of formation of the bent portion 226a at the projecting portion 226, the coupling strength between the bent portion 226a and the upper elastic member 150, ease of coupling work using conductive adhesive or solder and the like. Considering these, the width (W) of the projecting portion 226 and the bent portion 226a, which are the same width, may be set from 80 μm to 1000 μm.

Similarly to the width (W) of the bent portion 226a, the length (L) between a bent point (P) and an end of the bent portion 226a may also be predetermined in consideration of ease of formation of the bent portion 226a at the projecting portion 226, the coupling strength between the bent portion 226a and the upper elastic member 150, ease of coupling work using conductive adhesive or solder and the like. Considering these, the length (L) of the bent portion 226a may be set from 100 µm to 1000 µm.

The second coupling portion 224 may be the portion that is coupled to the base 210, and may be provided at an end of the support member 220. Although the second coupling portion 224 may be configured as a plate having a greater width than that of the first and second elastic deformation portions 222 and 223, the second coupling portion 224 may have a width equal to or smaller than the width of the first and second elastic deformation portions 222 and 223 without limitation.

According to the embodiment, the second coupling portion 224 may be divided into two elements, and may be inserted or disposed in the support member mount recess 214, as shown in FIGS. 8 and 9. The second coupling portion 224 may be fixedly coupled to the support member mount recess 214 by means of an adhesive material such as epoxy, or may be coupled to the base without the support member mount recess.

However, the disclosure is not limited thereto, and the support member mount recess 214 may be configured to correspond to the second coupling portion 224 and may be fitted in the second coupling portion 224. The second coupling portion 224 may include a single second coupling portion or two or more second coupling portions. The support member mount recess 214 may be formed at the base 210 in accordance with the number of second coupling portion 224.

The elastic deformation portions 222 and 223 may be bent at least once to provide a predetermined pattern. According to the embodiment, the elastic deformation portions may include first and/or second elastic deformation portions 222, 223. The first elastic deformation portion 222 extends from the first coupling portion 221 and may be connected to the connecting portion 225. The second elastic deformation portions 223 may extend from the second coupling portion 224, and may be connected to the connecting portion 225.

The elastic deformation portions 222 and 223 may be positioned with the connecting portion 225 disposed therebetween, and may be configured into a symmetric shape. When the first elastic deformation portion 222 is configured as two or more bent portions in a zigzag manner, the second elastic deformation portion 223 may also be correspondingly configured. However, the disclosure is not limited thereto, and the first elastic deformation portion 222 may be provided alone, or the second elastic deformation portion 223 may be configured so as to have some other structure.

The above configuration is merely an example, and the embodiment may be configured to have various patterns, such as a zigzag pattern. In this case, only one elastic deformation portion may be provided without division into the first and second elastic deformation portions 222 and 223, and the elastic deformation portion may be configured to have a suspension wire shape, rather than the above pattern.

According to the embodiment, straight portions of the first and second elastic deformation portions 222 and 223 may be approximately parallel to the plane, which is perpendicular to the first direction.

When the housing 140 moves in the second and/or third directions, which define a plane perpendicular to the first direction, the elastic deformation portions 222 and 223 may be elastically and finely deformed in the moving direction of the housing 140 or in the longitudinal direction of the support member 220.

As a result, since the housing 140 may move in the second and third directions, which define a plane substantially perpendicular to the first direction with almost no displacement in the first direction, the accuracy of handshake correction may be improved. This utilizes the property of the first and second elastic deformation portions 222 and 223, which are capable of extending in a longitudinal direction. The term "longitudinal direction" may refer to the direction of connection between first and second coupling portions 221 and 224.

Although the connecting portion 225 may be disposed between the first and second elastic deformation portions 222 and 223 as described above, the disclosure is not limited thereto. The connecting portion 225 may also be connected to one elastic deformation portion.

The connecting portion 225 may be configured into a plate shape to serve as a damper, and may be provided with a plurality of holes or recesses formed therein. Accordingly, by virtue of the holes or recesses, a damping unit may be constructed at the connecting portion 225 and the housing 140 using a UV damper.

Although one support member 220 is provided with a pair of first and second elastic deformation portions 222 and 223 in the embodiment, the first and second coupling portions 221 and 224 may be integrally constructed, and the pair of first and second elastic deformation portions 222 and 223 may be coupled to the housing 140 and the base 210 at one time.

The support member 220 may be provided at opposite ends thereof with one or more coupling portions, and one or more elastic deformation portions may be included between the opposite ends of the support member 220.

Figure 10:
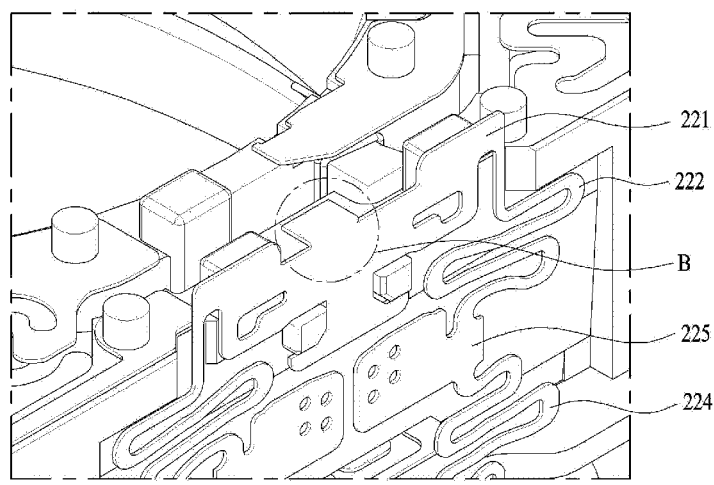
FIG. 10 is a fragmentary perspective view showing a manner of coupling the support member to the upper elastic member according to an embodiment.
Figure 11:
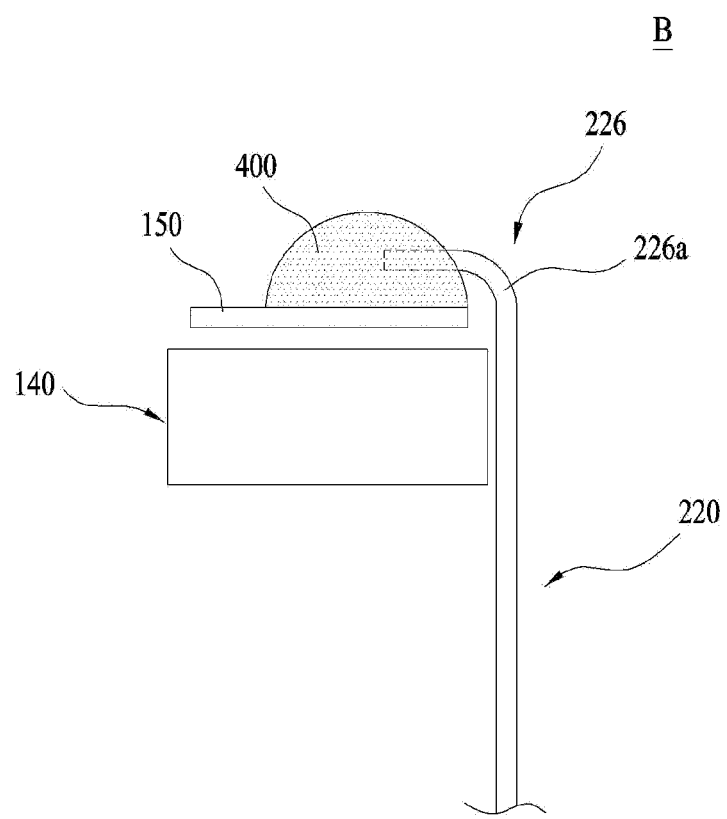
FIG. 11 is a side view showing the manner of coupling the support member to the upper elastic member according to the embodiment.
Figure 12:
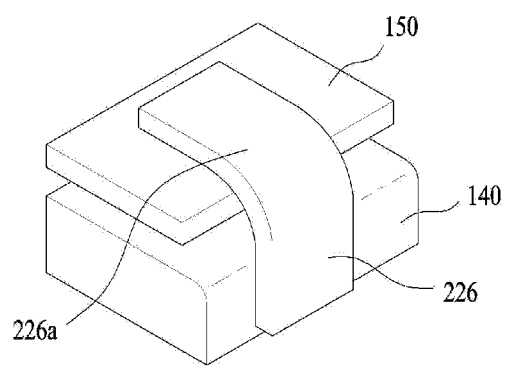
FIG. 12 is an enlarged perspective view showing the manner of coupling the support member to the upper elastic member according to the embodiment.
Figure 12:
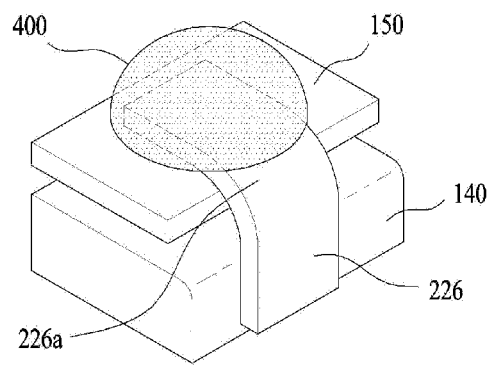

FIG. 10 is a fragmentary perspective view showing the manner in which the support member 220 is coupled to the upper elastic member 150 according to an embodiment. FIG. 11 is a side view showing the manner in which the support member 220 is coupled to the upper elastic member 150 according to the embodiment. FIG. 12 is an enlarged perspective view showing the manner in which the support member 220 is coupled to the upper elastic member 150 according to the embodiment.

In the embodiment, the bent portion 226a is bonded to the upper elastic member 150 by means of solder. A soldered portion 400, which has been formed by the solder, may envelop at least a portion of the bent portion 226a. The soldered portion 400 may be bonded to the upper elastic member 150 while bulging upward from the upper elastic member 150.

However, the bent portion 226a of the support member 220 may be bonded to the upper elastic member 150 not by means of solder but may means of conductive adhesive. That is, the bent portion 226a may be bonded to the upper elastic member 150 by any means so long as it allows current to flow therethrough.

The bent portion 226a may be positioned at an angle of −30° to 30° with respect to the upper surface of the upper elastic member 150. The angle may be predetermined in consideration of ease of formation of the bent portion 226a at the projecting portion 226, the coupling strength between the bent portion 226a and the upper elastic member 150, ease of coupling work using conductive adhesive or solder and the like.

The bent portion 226a may be formed to have a bending radius falling within a range of 0 µm to 300 µm. Similarly to the selection of the angle, the bending radius may also be predetermined in consideration of ease of formation of the bent portion 226a at the projecting portion 226, the coupling strength between the bent portion 226a and the upper elastic member 150, ease of coupling work using conductive adhesive or solder and the like.

When the bent portion 226a is bonded to the upper elastic member 150 by means of solder, as in the embodiment, the soldered portion 400 takes an approximate hemispheric shape bulging upward from the upper surface of the upper elastic member 150, and cures in the state of taking the hemispheric shape because the liquid solder has surface tension. Accordingly, the soldered portion 400 constitutes a hemispheric solder ball, and the projecting portion 226 is enveloped with the soldered portion 400.

Consequently, according to the embodiment, the coupling work of bonding the bent portion 226a to the upper elastic member 150 is facilitated by virtue of the shape of the solder. Furthermore, since the soldered portion 400 has a large bottom surface, the soldered portion 400 may be securely coupled to the upper elastic member 150, and thus the coupling between the support member 220 and the upper elastic member 150 becomes firm.

Accordingly, when a soldering process is performed using the support member 220 having the structure according to the embodiment, advantages may be obtained in that the soldering work is facilitated and the coupling strength between the upper elastic member 150 and the support member 220 is remarkably improved.

Figure 13:
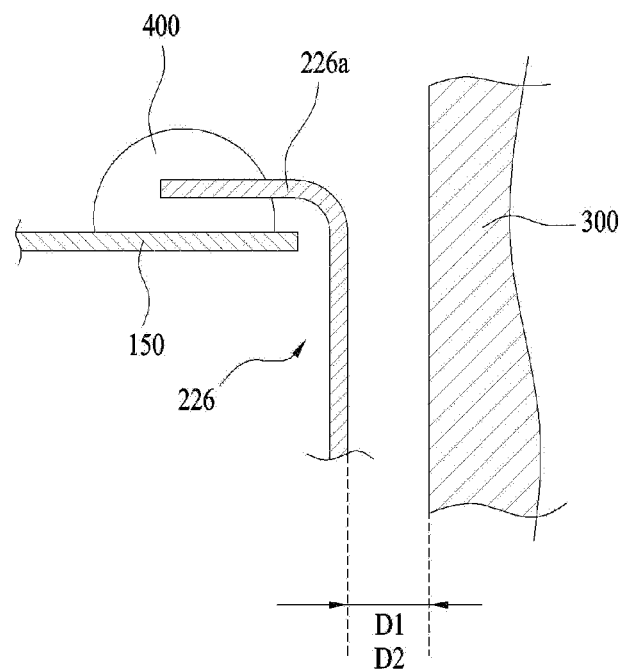
FIG. 13 is a cross-sectional view showing a coupling structure according to the embodiment in which the support member is bonded to the upper elastic member by means of solder.

FIG. 13 is a cross-sectional view showing a coupling structure according to the embodiment in which the support member 220 is bonded to the upper elastic member 150 by means of solder.

As shown in FIG. 13, according to the embodiment, the distance (D2) between the outer surface of the support member 220 and the inner surface of the cover member 300 becomes identical to the distance (D1) within which the support member 220 can be displaced toward the cover member 300 in the second and/or third directions.

According to the embodiment, since the distance (D1) within which the support member 220 can be displaced toward the cover member 300 in the second and/or third directions may be greatly increased, and thus the moving space of the support member 220 can be widened, handshake correction by the support member 220 can be more efficiently achieved.

Figure 14A:
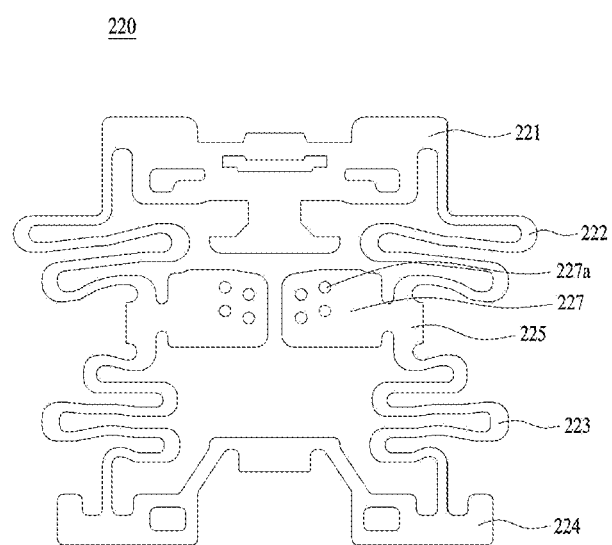
FIG. 14A is a front view showing a support member according to one embodiment.
Figure 14B:
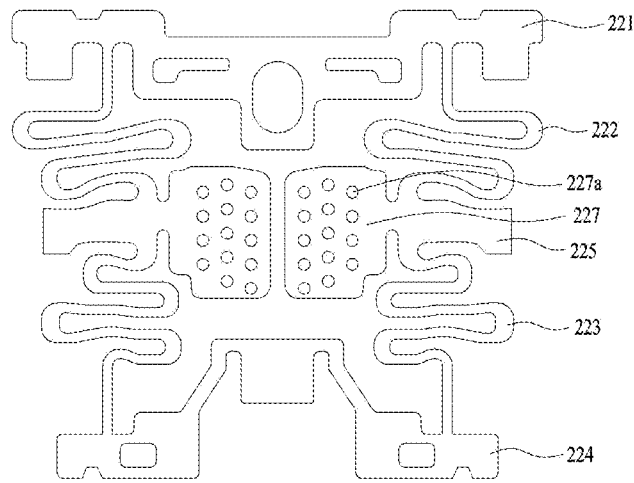
FIG. 14B is a front view showing a support member according to another embodiment.
Figure 14C:
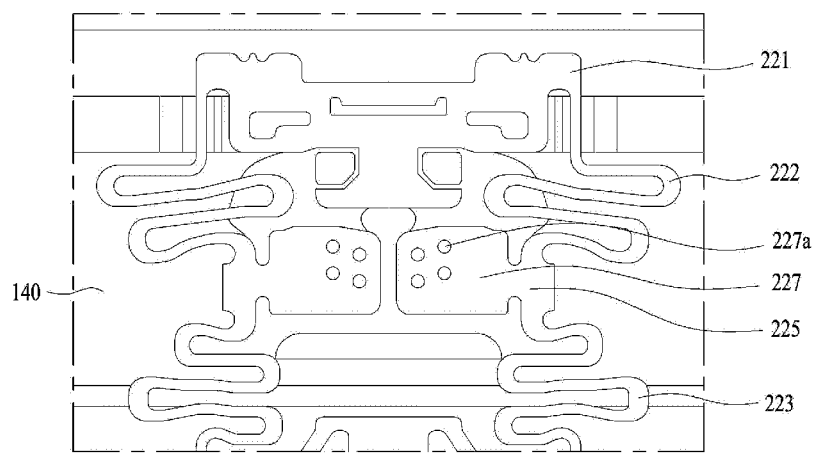
FIG. 14C is a front view showing the support member according to the one embodiment which is mounted on the housing.
Figure 14D:
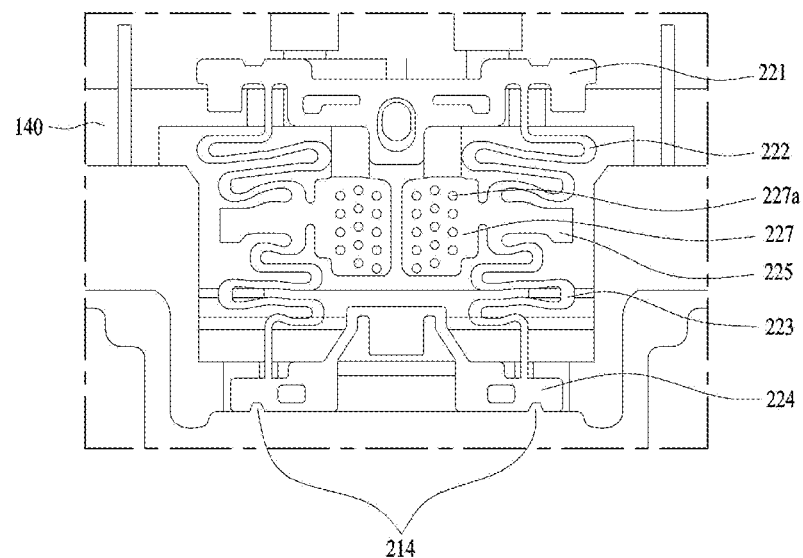
FIG. 14D is a front view showing the support member according to the another embodiment which is mounted on the housing.

FIG. 14A is a front view showing a support member 220 according to one embodiment. FIG. 14B is a front view showing a support member 220 according to another embodiment. FIG. 14C is a front view showing the support member 220 according to the one embodiment, which is mounted on the housing 140. FIG. 14D is a front view showing the support member 220 according to the another embodiment, which is mounted on the housing 140.

The support member 220 is disposed on a side surface of the housing 140. The support member 220 is coupled at the upper portion thereof to the housing 140 and coupled at the lower portion thereof to the base 210. The support member 220 supports the bobbin 110 and the housing 140 such that the bobbin 110 and the housing 140 can be moved in the second and third directions, which are perpendicular to the first direction. The support member 220 may be conductively connected to the coil 120, and may be provided at at least a portion thereof with a bonding portion 226-1 for controlling damping coefficient.

One end of the support member 220 may be inserted or disposed in the support member mount recess 214 and then secured thereto by means of adhesive material such as epoxy, and the other end of the support member 220 may be coupled to an upper end of a side wall of the housing 140.

Specifically, the support member 220 of the one embodiment may include a first coupling portion 221, a second coupling portion 224, a first elastic deformation portion 222, a second elastic deformation portion 223, a connecting portion 225, and control plates 227. The support member 220 according to the another embodiment may include a first coupling portion 221, a second coupling portion 224, and a connecting portion 225. A portion of the connecting portion may serve as a control plate, or may serve as an elastic deformation portion.

The first coupling portion 221 according to the one embodiment may be the portion to be coupled to the second surface 142 of the housing 140, and may be securely fitted or disposed in a recess formed at a position corresponding to a coupling protrusion formed at the second surface 142.

The connecting portion 225 may include a pair of connecting portions which are symmetrically disposed to connect the first elastic deformation portion 222 and the second elastic deformation portion 223 to each other.

The control plates 227 are coupled to the pair of connecting portions 225, respectively. The bonding portion 226-1 of the support member 220 is at least partially coupled to the control plates 227. The control plates 227 are configured to be turned in at least one of the first, second and third directions depending on deformation of the support member 220. The control plates 227 may be disposed to face each other, and may be secured or coupled to each other by virtue of the bonding portion 226-1.

The control plates 227 may function to control the damping coefficient of the support member. Specifically, the control plates 227 may deform the shape of the support member 220 to control the damping coefficient of the support member 220 by turning in at least one of the first, second and third directions. The damping coefficient of the support member 220 may vary in accordance with the shape deformation of the support member 220. More specifically, after the control plates 227 are turned and positioned such that the shape of the support member 220 is deformed to a predetermined extent and thus the support member 220 has a desired damping coefficient, the bonding portion 226-1 is placed on the support member 220 and hardened to maintain the deformed state of the support member 220 and the control plates 227.

Here, since the damping coefficient is predetermined in proportion to the displacement of the control plates 227 relative to the elastic deformation portions 222 and 223, it is possible to select the optimal damping coefficient at which the control characteristic is optimized in a design procedure by controlling the position, rotating angle and the like of the control plates 227.

When the control plates 227 are not provided or the bonding portion 226-1 is disposed at an area excluding the control plates 227, for example, at the elastic deformation portions 222 and 223 and/or the connecting portion 225 even though the control plates 227 are provided, it is impossible to improve the damping coefficient to meet or exceed a desired value because the relative displacement between the elastic deformation portions 222 and 223 and the connecting portion 225 becomes smaller than a predetermined range. Accordingly, in such a case, it is impossible to obtain a desired damping coefficient, which may result in deterioration of the control characteristics of the support member 220.

The bonding portion 226-1 may be made of thermosetting material, ultraviolet-curable material or the like so as to facilitate its disposition operation, and may be a damping member. The damping member may be made of a gel type material such as an ultraviolet damper or damping silicone.

In an embodiment, the control plates 227 may be configured into plate shapes, and may be provided with a plurality of through holes 227a or recesses. Although the through holes 227a are illustrated in the drawings for clarity of explanation, the control plates 227 may be provided with recesses in place of the through holes 227a, or may be provided with the through holes 227a together with the recesses.

When the bonding portion 226-1 in liquid state is introduced into the through holes 227a or the recesses and hardens in place, the coupling strength of the bonding portion 226-1 to the support member 220 may be improved. In particular, when the bonding portion 226-1 is made of thermosetting material or ultraviolet-curable material, infrared rays or ultraviolet rays can easily infiltrate the bonding portion 226-1 through the through holes 227a, thus improving the hardening rate of the bonding portion 226-1.

The presence of the bonding portion 226-1 disposed on the support member 220 may enable control of the damping coefficient of the support member 220. The support member 220 may be controlled in moving speed in the second and/or third directions, frequency and the like by controlling the damping coefficient.

The damping coefficient should be properly selected so as to efficiently control the movement of the support member 220 in the first and second directions and to avoid a resonance phenomenon caused by driving or vibration of the support member 220.

The proper selection of the damping coefficient of the support member 220 may be implemented in such a way as to dispose various numbers of bonding portions 226-1 at various positions of the support member 220.

Hereinafter, various embodiments regarding the disposition and number of bonding portions 226-1 will be described with reference to the respective drawings.

Figure 15A:
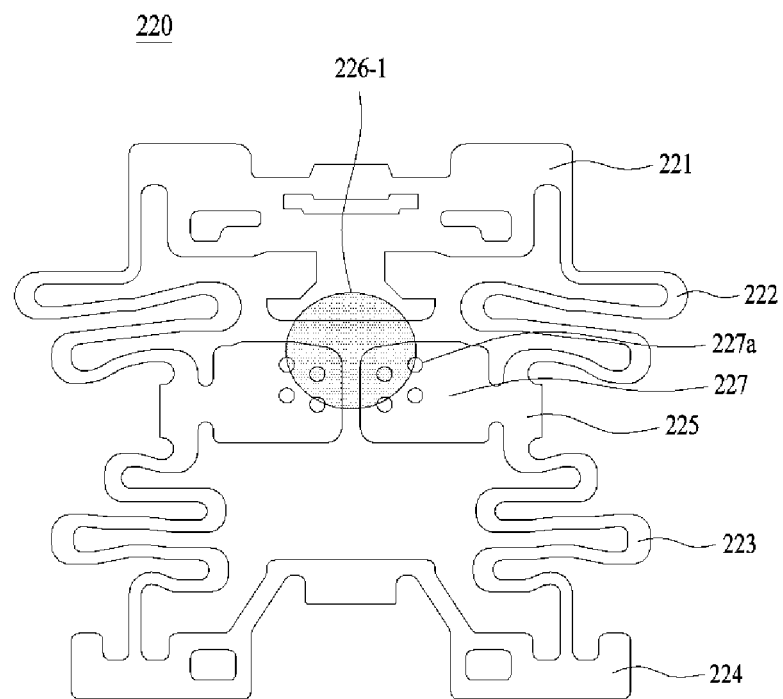
FIG. 15A is a front view showing one embodiment of the bonding portion disposed at the support member according to the one embodiment.
Figure 15B:
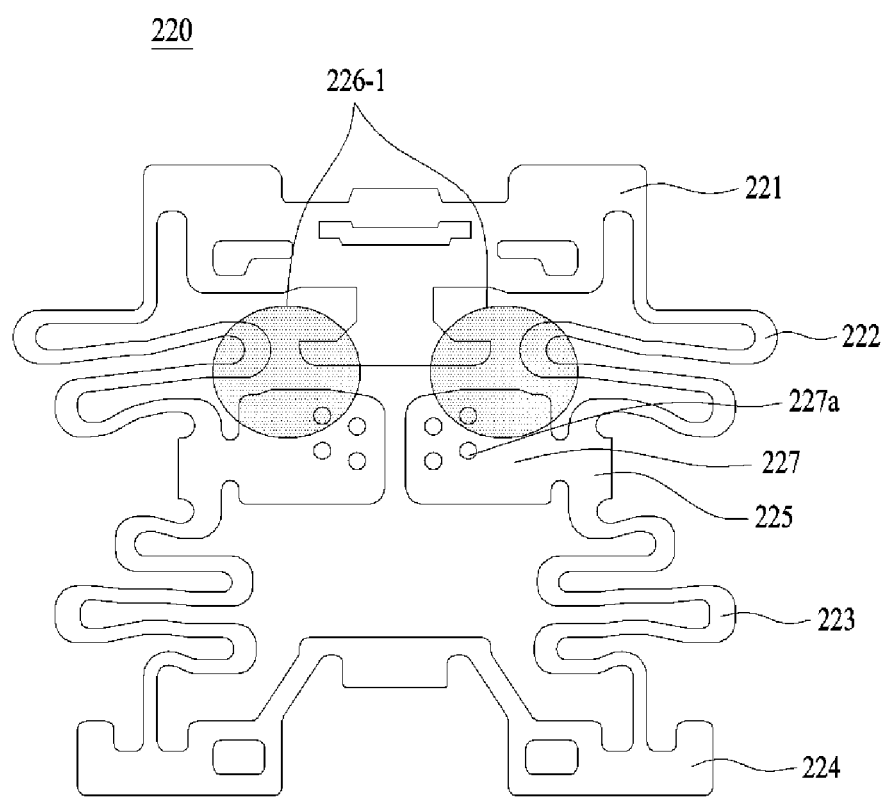
FIG. 15B is a front view showing another embodiment of the bonding portion disposed at the support member according to the one embodiment.

FIG. 15A is a front view showing one embodiment of the bonding portion 226-1 disposed at the support member 220 according to the one embodiment. FIG. 15B is a front view showing another embodiment of the bonding portion 226-1 disposed at the support member 220 according to the one embodiment.

As shown in FIG. 15A, according to the one embodiment, a single bonding portion 226-1 is disposed, and the bonding portion 226-1 may secure or couple the control plates 227 and the first coupling portion 221 to one another.

As shown in FIG. 15B, according to the another embodiment, a pair of bonding portions 226-1 are disposed, and the pair of bonding portions 226-1 may secure or couple the control plates 227, the first coupling portion 221 and the first elastic deformation portion 222 to one another.

As described above, the through holes 227a formed at the control plates 227 help to improve the coupling strength of the bonding portion 226-1 to the support member 220 and also help to improve the hardening rate of the bonding portion 226-1 in the case where the bonding portion 226-1 is made of thermosetting material or ultraviolet-curable material.

The position and number of bonding portions 226-1 disclosed herein are merely an example, and the bonding portions 226-1 may be provided at various positions and in various numbers.

Although not shown in the drawings, the bonding portion 226-1 may also secure or couple only the control plates 227 to each other. For example, the bonding portion 226-1 may secure or couple the control plates 227 to each other at at least one of upper portions, center portions and lower portions thereof, which are opposite each other.

Figure 16A:
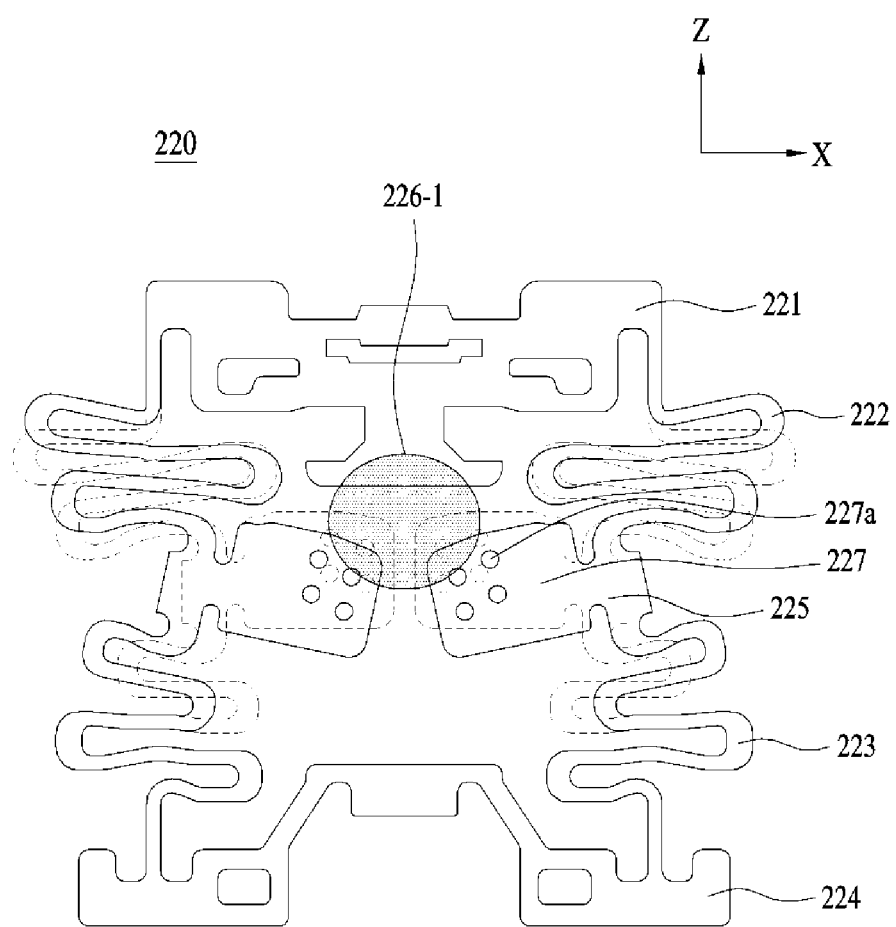
FIGS. 16A and 16B are front views showing further embodiments of the bonding portion disposed at the support member according to the one embodiment.
Figure 16B:
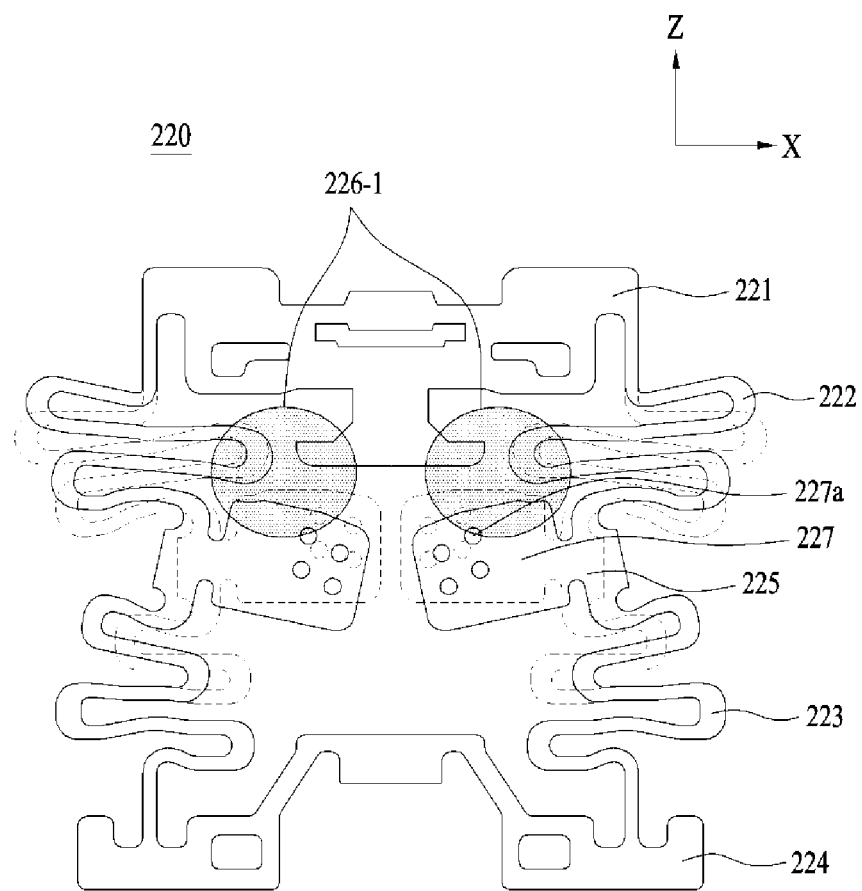
Figure 17:
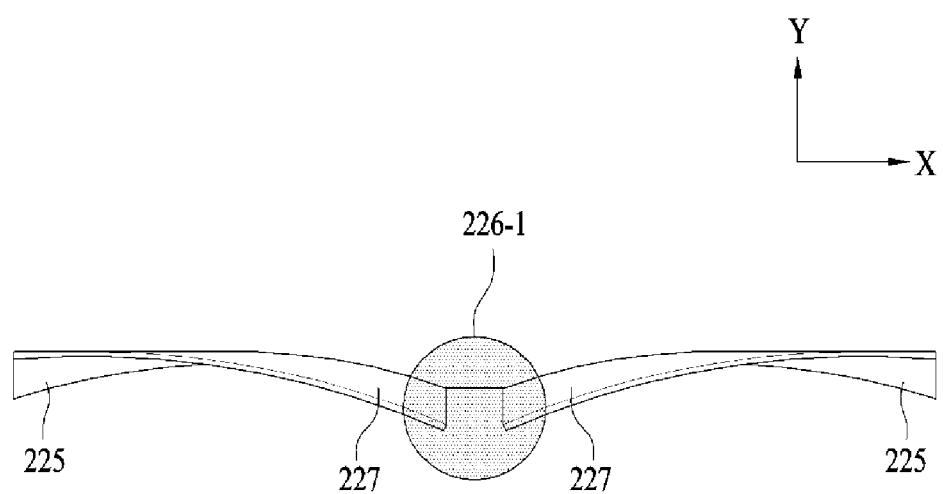
FIG. 17 is a schematic plan view showing a further embodiment of the bonding portion disposed at the support member according to the one embodiment.

FIGS. 16A and 16B are front views showing another embodiment of the bonding portion 226-1 disposed at the support member 220 according to the one embodiment. FIG. 17 is a schematic plan view showing a further embodiment of the bonding portion 226-1 disposed at the support member 220 according to the one embodiment.

As shown in FIG. 16A, the respective control plates 227 may be positioned on a plane defined by x and z axes in the state of being rotated a predetermined angle around the y axis. In this configuration state, a single bonding portion 226-1 may be provided to secure or couple the respective control plates 227 and the first coupling portion 221 to each other.

As shown in FIG. 16B, the respective control plates 227 may be positioned on a plane defined by x and z axes in the state of being rotated a predetermined angle around the y axis. In this configuration state, two bonding portions 226-1 may be provided to secure or couple the respective control plates 227, the first coupling portion 221 and the first elastic deformation portion 222 to each other.

Since the support member 220 is configured such that the first coupling portion 221, the second coupling portion 224, the first elastic deformation portion 222, the second elastic deformation portion 223, the connecting portion 225 and the control plates 227 are symmetrically disposed, the components need to be put in balance. To this end, the pair of control plates 227 may be turned in different directions from each other such that the respective components are symmetrically disposed.

The position and number of bonding portion 226-1 disclosed herein are merely an example, and the bonding portions 226-1 may be provided at various positions and in various numbers.

Although not shown in the drawings, the bonding portion 226-1 may also secure or couple only the control plates 227 of the bonding portion 226-1 to each other, as described above. For example, the bonding portion 226-1 may secure or couple the control plates 227 to each other at at least one of upper portions, center portions and lower portions thereof, which are opposite each other.

As shown in FIG. 17, according to the further embodiment, the respective control plates 227 may be positioned on a plane defined by x and y axes in the state of being rotated a predetermined angle around z axis. In this configuration state, at least one bonding portion 226-1 may be provided to secure or couple the respective control plates 227 and the first coupling portion 221 to each other, or to secure or couple the control plates 227, the first coupling portion 221 and the first elastic deformation portion 222 to each other.

Although not shown in the drawings, the bonding portion 226-1 may also secure or couple only the control plates 227 of the bonding portion 226-1 to each other, as described above. For example, the bonding portion 226-1 may secure or couple the control plates 227 to each other at at least one of upper portions, center portions and lower portions thereof, which are opposite each other.

As described above, since the support member 220 is configured such that the first coupling portion 221, the second coupling portion 224, the first elastic deformation portion 222, the second elastic deformation portion 223, the connecting portion 225 and the control plates 227 are symmetrically disposed, the components need to be put in balance. To this end, the pair of control plates 227 may be turned in different directions from each other such that the respective components are symmetrically disposed.

Although not shown in the drawings, the bonding portion 226-1 may be formed in the above-described manner after the control plates 227 are three-dimensionally turned around the y and z axes.

The damping coefficient of the support member 220 may be predetermined in accordance with the position and number of bonding portions 226-1, the rotating direction and rotating angle of the control plates 227, and the like. Accordingly, in order to obtain a desired damping coefficient, that is, the damping coefficient that enables resonance of the support member 220 to be avoided and realizes a desired moving speed in second and/or third directions the support member 220 or a desired frequency of the support member 220, various numbers of bonding portions 226-1 are disposed at various positions, and the damping coefficient of the support member 220 is measured. As a result, it is possible to use a support member 220 having the desired damping coefficient.

According to the embodiment, the damping coefficient may be changed by controlling the position and number of the bonding portion 226-1 and the direction of the rotating angle of the control plates 227. By controlling the damping coefficient, it is possible to avoid resonance of the support member 220 and to ensure excellent control characteristic of the support member 220.

According to the embodiment, since the support member 220 is constructed such that respective components thereof are coupled to each other by the bonding portion 226-1, rapid overall or local deformation of the support member 220 does not occur even if it suffers a fall or is subjected to an external shock, thus ensuring mechanical reliability for the control of the support member 220.

The lens moving apparatus according to the above embodiments may be applied to various fields of products, for example, camera modules. For example, a camera module may be applied to mobile devices such as cellular phones.

The camera module according to the embodiment may include a lens barrel coupled to the bobbin 110, an image sensor (not shown), a printed circuit board 250 and an optical system.

The lens barrel is as described above, and the printed circuit board 250 is the component on which the image sensor is mounted, and may constitute the bottom surface of the camera module.

The optical system may include at least one lens for transmitting an image to the image sensor. The optical system may be provided with an actuator module capable of fulfilling functions of autofocusing and handshake correction. The actuator module functioning to fulfill the function of autofocusing may be variously constructed, and a voice coil unit motor is primarily used in the actuator module. The lens moving apparatus according to the embodiments may serve as an actuator module fulfilling both functions of autofocusing and handshake correction.

The camera module may further include an infrared ray screening filter (not shown). The infrared ray screening filter functions to block the incidence of light in the infrared range on the image sensor. In the base 210 illustrated in FIG. 1, the infrared ray screening filter may be installed at a position corresponding to the image sensor, and may be coupled to a holder member (not shown). The base 210 may support the lower portion of the holder member.

The base 210 may be provided with an additional terminal member for conductive connection to the printed circuit board 250, and the terminal may be integrally formed using a surface electrode. The base 210 may serve as a sensor holder for protecting the image sensor. In this case, although a projecting portion may be formed downward along the lateral surface of the base 210, it is not an essential component. Although not shown in the drawings, an additional sensor holder may be disposed under the base 210 to serve as the projecting portion.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:
    a housing supporting a driving magnet;
    a bobbin provided on an outer surface thereof with a coil disposed in the driving magnet and moving in a first direction in the housing;
    a base disposed under the bobbin to be spaced apart from the bobbin by a predetermined distance;
    an upper elastic member disposed above the bobbin and including an inner frame coupled to the bobbin and an outer frame coupled to the housing;
    a lower elastic member disposed under the bobbin and including an inner frame coupled to the bobbin and an outer frame coupled to the housing;
    a support member coupled at a lower portion thereof to the base and including a projecting portion protruding upward, a portion of the projecting portion being coupled to the upper elastic member;
    a pair of control plates disposed at the support member; and
    a bonding portion disposed at at least a portion of the pair of control plates,
    wherein the pair of control plates and the bonding portion control a damping coefficient of the support member,
    wherein the pair of control plates includes a plurality of through holes, and
    wherein the bonding portion is initially provided in a liquid state and is introduced into the plurality of through holes and hardens in place.

2. The lens moving apparatus according to claim 1, wherein the support member is configured such that a portion of a surface of the projecting portion faces an upper surface of the upper elastic member, and the upper elastic member is coupled to the projecting portion by means of a conductive bonding material.

3. The lens moving apparatus according to claim 2, wherein the conductive bonding material is made of solder or conductive adhesive, and
    wherein the solder forms a solder portion securely enveloping a portion of the projecting portion and bulging upward from the upper elastic member, and the solder portion is disposed on the upper elastic member and coupled thereto.

4. The lens moving apparatus according to claim 2, wherein the support member comprises:

a first coupling portion that includes the projecting portion and is coupled to the upper elastic member;
a second coupling portion coupled to the base;
a first elastic deformation portion extending from the first coupling portion; and
a second elastic deformation portion extending from the second coupling portion.

5. The lens moving apparatus according to claim 2, wherein the support member includes a plurality of support members disposed to surround the bobbin, and the projecting portion includes a plurality of projecting portions spaced apart from each other by a predetermined distance in a second direction, which is perpendicular to the first direction.

6. The lens moving apparatus according to claim 2, wherein a portion of the projecting portion is disposed to define an angle of −30° to 30° with respect to the upper surface of the upper elastic member.

7. The lens moving apparatus according to claim 2, wherein the projection portion has a width of 80 μm to 1000 μm.

8. The lens moving apparatus according to claim 4, wherein the support member further comprises a connecting portion connected between the first elastic deformation portion and the second elastic deformation portion.

9. The lens moving apparatus according to claim 2, wherein the projecting portion is formed integrally to the support member, or is separately formed to have a bent portion and is coupled to an upper portion of the support member.

10. A lens moving apparatus comprising:
a housing supporting a driving magnet;
a bobbin provided on an outer surface thereof with a coil disposed in the driving magnet and moving in a first direction in the housing;
a base disposed under the bobbin to be spaced apart from the bobbin by a predetermined distance;
an upper elastic member disposed above the bobbin and including an inner frame coupled to the bobbin and an outer frame coupled to the housing;
a lower elastic member disposed under the bobbin and including an inner frame coupled to the bobbin and an outer frame coupled to the housing;
a support member disposed at a lateral surface of the housing, the support member being coupled at an upper portion thereof to the housing and coupled at a lower portion thereof to the base, and supporting the bobbin and the housing such that the bobbin and the housing are movable in second and third directions, which are perpendicular to the first direction;
a pair of control plates disposed at the support member; and
a bonding portion disposed at at least a portion of the pair of control plates,
wherein the pair of control plates and the bonding portion control a damping coefficient of the support member,
wherein the pair of control plates includes a plurality of through holes, and
wherein the bonding portion is initially provided in a liquid state and is introduced into the plurality of through holes and hardens in place.

11. The lens moving apparatus according to claim 10, wherein the support member comprises:
a first coupling portion coupled to the housing;
a second coupling portion coupled to the base;
a pair of first elastic deformation portions that extend from the first coupling portion and are symmetrically disposed with respect to each other;
a pair of second elastic deformation portions that extend from the second coupling portion and are symmetrically disposed with respect to each other; and
a pair of connecting portions, wherein each of the connecting portions is connected to a first elastic deformation portion of the pair of first elastic deformation portions and a second elastic deformation portion of the pair of second elastic deformation portions, and
wherein the pair of connecting portions connect the pair of first elastic deformation portions and the pair of second elastic deformation portions.

12. The lens moving apparatus according to claim 11, wherein the pair of connecting portions includes the pair of control plates that are coupled to at least a portion of the bonding portion of the support member and are turned in one of the first, second and third directions depending on deformation of the support member, and
wherein the pair of control plates are disposed to face each other.

13. The lens moving apparatus according to claim 12, wherein the pair of control plates are secured or coupled to each other by the bonding portion,
wherein the bonding portion secures or couples the pair of control plates to each other at at least one portion of upper portions, center portions and lower portions thereof, which are opposite each other.

14. The lens moving apparatus according to claim 12, wherein the bonding portion includes a plurality of bonding portions, and each of the plurality of bonding portions secures or couples the pair of control plates and the first coupling portion to one another, or secures or couples the pair of control plates, the first coupling portion and the pair of first elastic deformation portions to one another.

15. The lens moving apparatus according to claim 12, wherein the pair of control plates are secured or coupled to each other by the bonding portion in a state of being turned by a predetermined angle in one of the first, second and third directions, and the pair of control plates and the first coupling portion are secured or coupled to one another by the bonding portion.

16. The lens moving apparatus according to claim 12, wherein the pair of control plates includes a plurality of through holes and/or recesses formed in at least a portion thereof, and the base includes a mount recess into which the second coupling portion is coupled.

17. The lens moving apparatus according to claim 10, wherein the support member is conductively connected to the upper and lower elastic members.

18. The lens moving apparatus according to claim 10, wherein the bonding portion is made of a thermosetting material or an ultraviolet-curable material.

19. The lens moving apparatus according to claim 11, wherein the pair of connecting portions are symmetrically disposed with respect to each other.

20. The lens moving apparatus according to claim 1, further comprising a cover member accommodating the support member, wherein a distance between an outer surface of the support member and an inner surface of the cover member is equal to a movable distance of the support member toward the cover member in at least one of a second direction and a third direction, both of which are perpendicular to the first direction.

* * * * *